Figure 1:
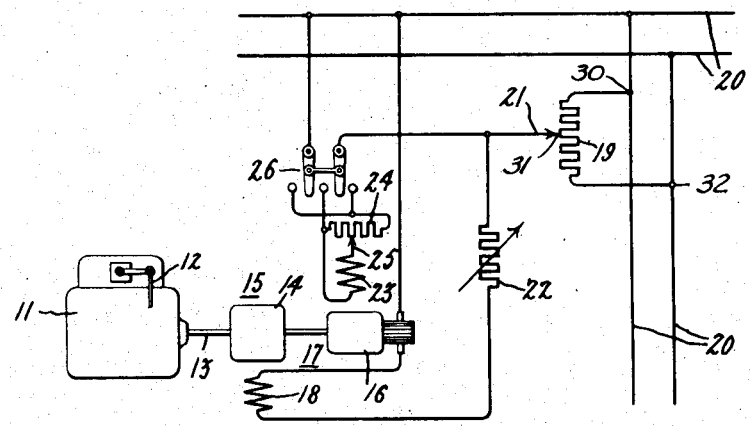

Oct. 27, 1942.    K. R. McDOUGAL    2,300,163
ELECTRIC DYNAMOMETER
Filed July 26, 1940

Inventor:
Kenneth R. McDougal,
by Harry E. Dunham
His Attorney.

Patented Oct. 27, 1942

2,300,163

UNITED STATES PATENT OFFICE 2,300,163

ELECTRIC DYNAMOMETER

Kenneth R. McDougal, Fort Wayne, Ind., assignor to General Electric Company, a corporation of New York Application July 26, 1940, Serial No. 347,715

3 Claims. (Cl. 73—51)

This invention relates to electric dynamometers and more particularly dynamometers of the eddy current brake type for use as absorption devices in loading and measuring the load of prime movers such as internal combustion engines and the like.

It is an object of my invention to provide an improved dynamometer control system.

It is another object of my invention to provide improved means for stabilizing the operation of an eddy current dynamometer employed for testing prime movers such as internal combustion engines, which stabilizing means is automatically protected against excessive voltages and will provide sufficient torque irrespective of the dynamometer speed to prevent excessive speeds of the prime mover.

It is still another object of my invention to provide means for automatically adjusting the stabilizing effect to a value approximately proportional to the total excitation of the dynamometer.

It is a further object of my invention to provide improved means for stabilizing the operation of an eddy current dynamometer employed for testing prime movers which enables the prime mover under test to be fully loaded at low speeds without the necessity of employing an excessively large and expensive design of the eddy current machine.

Other and further objects and advantages will become apparent as the description proceeds.

In a copending application of Max A. Whiting, Serial No. 347,746, filed July 26, 1940, and entitled "Electric dynamometer," there is described and broadly claimed an electric dynamometer stabilizing system including an auxiliary or booster exciter having its armature connected in series additive or cumulative relation with a constant voltage source of electrical power supply for supplying the excitation to the field of the eddy current dynamometer which is employed to load the prime mover under test. The booster exciter is driven at a speed proportional to the dynamometer so that the exciter furnishes a limited boost effect or increase in the voltage to the dynamometer field, depending upon the size of the unit, in accordance with variations in speed to provide sufficient increase in the slope of the torque curve to stabilize the operation of the dynamometer. The auxiliary exciter in one instance is separately excited from a constant voltage source of supply and in another instance the auxiliary exciter is self-excited. The exciter armature and the dynamometer field are connected to the constant voltage source of supply through a potentiometer arrangement or through a variable resistance.

In my improved arrangement, the shunt field of the auxiliary or booster exciter is connected across the main potentiometer which furnishes the excitation from the constant voltage source. Such a connection provides automatic protection against excessive voltages and the booster exciter will provide sufficient torque irrespective of the dynamometer speed to prevent excessive speeds of the prime mover. Also, the stabilizing effect automatically bears a proportional relation to the total dynamometer excitation. In a modification, the dynamometer is provided with two field windings one of which is excited by the auxiliary exciter and the other of which is excited from the constant voltage source of supply. The foregoing arrangements provide simple and convenient means for increasing the slope of the dynamometer torque curve so that its slope will be greater than that of the engine torque curve at any point to prevent the engine or prime mover being tested from hunting or overspeeding.

Figure 2:
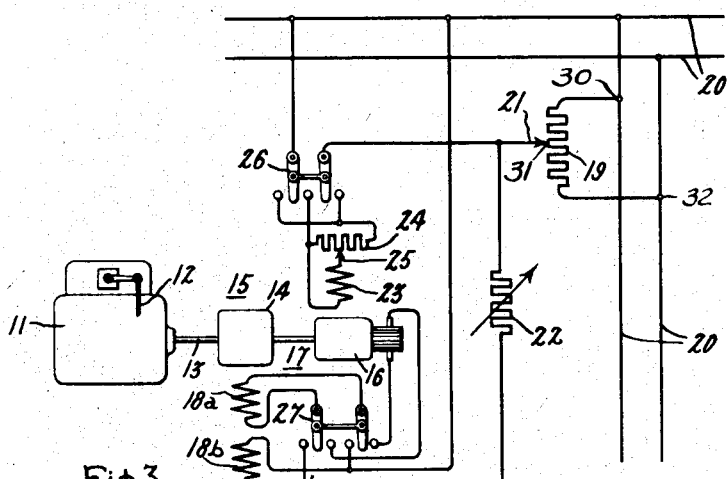
Figure 3:
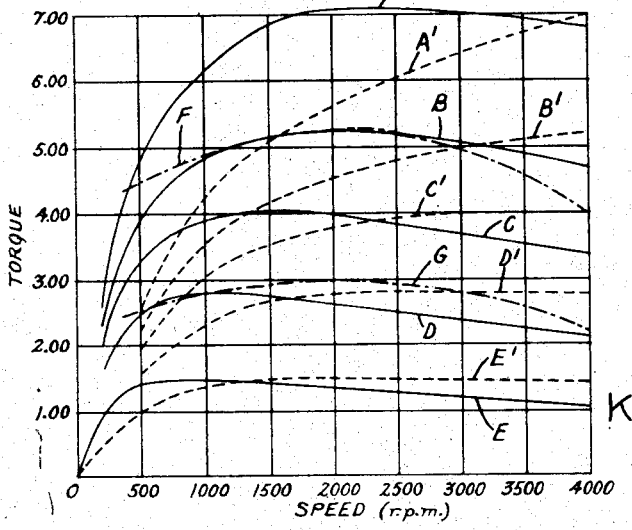

The novel features which are characteristic of my invention are set forth with particularity in the appended claims. My invention, however, both as to its organization and its method of operation will be better understood from reference to the following description when considered in connection with the accompanying drawings in which Fig. 1 is a schematic electric circuit diagram of apparatus arranged in accordance with my invention; Fig. 2 is a modification of the arrangement of Fig. 1; and Fig. 3 illustrates several characteristic curves which will be employed in explaining my invention.

Referring to Fig. 1 of the drawings the numeral 11 represents a prime mover in the form of an internal combustion engine having a throttle 12 and mechanically connected by means of a rotary shaft 13 to the rotor 14 of a dynamometer 15, for example, of the inductor eddy current type. Connected also to the shaft 13 is the rotor or armature 16 of a direct current dynamo-electric machine 17. The dynamometer 15 is provided with an exciting winding 18 which is adapted to be connected in cumulative or additive series circuit relation with the armature circuit of the rotor 16 of the exciter 17 to a potentiometer arrangement 19 which is connected to a substantially constant direct current source of supply 20. An adjustable tap or connection 21 serves as a major adjustment for excitation of the dynamometer field winding 18 by providing a convenient arrangement for obtaining various adjustable voltages from the source of supply 20. A variable resistance element 22 connected in the circuit of the booster exciter armature 16 and the field winding 18 provides a slight vernier adjustment necessary to obtain the exact dynamometer field current required. The booster exciter 17 is provided with a field winding 23 which is adapted to be energized to various adjustable values from a field rheostat 24 connected as a potentiometer and having an adjustable contact 25. The rheostat or potentiometer 24 is connected in parallel relation with the armature 16 and the field winding 18 through a field reversing switch 26. Consequently, movement of the adjustable connection 21 similarly and simultaneously varies or changes the excitation of the field winding 23 as well as the voltage across the circuit including the armature 16 and the dynamometer field winding 18 and provides a common electric circuit arrangement for controlling the energization of the generator field exciting winding 23 and the dynamometer magnetic field producing winding 18.

In Fig. 2 I have shown an arrangement which is similar to the apparatus in Fig. 1 but which differs therefrom primarily in that the dynamometer 15 is provided with a pair of field windings 18a and 18b. A double-pole double-throw switch 27 is provided which when thrown to the right connects the field winding 18a across the terminals of the armature 16 of the auxiliary exciter 17, and when thrown to the left connects this field winding in parallel with the field winding 18b. The field winding 18b is connected in circuit with the vernier rheostat 22 to the potentiometer element 19 through the adjustable connection or contact 21. The voltage generated by the auxiliary exciter 16 for a given speed and consequently the energization of the winding 18a at this speed, with switch 27 thrown to the right position, is governed by the adjustment of the potentiometers 19 and 24. The energization supplied to the field winding 18b which is in additive relation with respect to the field 18a depends primarily upon the setting of the potentiometer adjustment 21 and to a small extent upon the adjustment of the vernier rheostat 22. When the switch 27 is thrown to the left position, the energization of the field exciting winding 18a is supplied from the constant voltage source 20 and controlled simultaneously with the field winding 18b.

In each of the foregoing arrangements of Figs. 1 and 2 the exciter generator 17 supplies a component of voltage to excite the dynamometer 15 which component varies in accordance with and is responsive to the dynamometer speed. Consequently, in those cases where the dynamometer torque curve and the engine or other prime mover torque curves are coincident, any change in speed of the dynamometer is accompanied by an increase in excitation and a corresponding increase in torque with the result that the dynamometer is prevented from hunting or overspeeding. In other words, the operation is stabilized.

As understood by those skilled in the art, an eddy current dynamometer, such as 15, consists of a suitable eddy current brake, a source of excitation for its field and some means for measuring the torque exerted upon the dynamometer by the apparatus to be tested. The torque measuring arrangement commonly but not necessarily consists of a cradle mounting of the dynamometer stator and a balance scale beam which is reacted upon by the cradled stator. Such details are not shown herein since they are well known and form no part of the present invention.

In the testing of prime movers such as internal combustion engines, for example, it is desirable when an eddy current dynamometer is employed for loading the prime mover or engine under test to design the eddy current dynamometer in order that it may have a high absorption capacity per pound of dead weight, per cubic foot of space occupied, and per dollar of cost and at the same time have the suitable characteristics and the flexibility of operation required for utility and convenience of operation.

In order to obtain a better understanding of the principle of operation, let it be assumed that the eddy current braking member of the dynamometer under consideration has a set of characteristics essentially like those of the brake referred to but having whatever scale of specific values is suitable to the testing requirements of a typical automobile engine. In the drawing Fig. 3 shows such a set of characteristics.

Curve A shows the torque of the eddy current member 15 plotted against speed when normal maximum excitation of the field winding 18 is held constant. Curve B shows the corresponding characteristic when 75 per cent field is held, and similarly, curves C, D and E show respectively curves for 60, 45 and 30 per cent of maximum excitation. Curve F is a representative speed-torque curve of an internal combustion engine. If we consider the vertical scale of Fig. 3 as in arbitrary torque units and not in pound-feet, curve F represents directly the characteristic of the engine. Imagine that an engine having the characteristic of curve F is to be tested by means of the dynamometer whose characteristics are those of A to E inclusive. By selecting various values of excitation between 75 per cent and 100 per cent, the engine load and speed can be held constant at any set of values between a torque of 4.45 at 425 R. P. M. and probably a torque of 4.90 at 1,000 R. P. M. From 1,000 R. P. M. to 1,500 R. P. M. the brake torque at any one value of excitation in the vicinity of 75 per cent rises a little as the speed increases but only a very little faster than the engine torque. Therefore, between 1,000 R. P. M. and 1,500 R. P. M., the dynamometer or brake will prevent the engine from running away and will tend to hold it at a constant load and speed. The margin of dominance of the brake torque over the engine torque as the speed is increased from 1,000 to 1,500 R. P. M. is so slight, however, that momentary slight irregularities in fueling, ignition or the like of the engine under test may cause the speed to fluctuate or drift more widely from the mean than is consistent with precise and convenient testing.

In the range including a torque of 5.09 at 1,500 R. P. M. to a torque of 5.25 at 2,000 R. P. M., it happens that the engine torque and the brake torque are almost coincident throughout so that a very slight departure of either value from its normal characteristics will cause the speed to vary widely and the scale beam to become unbalanced. If the speed increases very slightly beyond 2,000 R. P. M., the engine torque establishes a slight but definite preponderance over that of the dynamometer and the speed rises to approximately 2600 R. P. M. beyond which the engine torque falls off slightly more rapidly than that of the dynamometer. Accordingly the engine will not speed up indefinitely but will run at a speed in the vicinity of 2600 R. P. M. but subject to a degree of variation. It is obvious that the foregoing represents a thoroughly unsuitable dynamometer characteristic.

Suppose that an attempt were made to test a smaller engine whose throttle characteristic of torque against speed is that of curve G. With a dynamometer excitation of 45 per cent corresponding to the dynamometer characteristic D, the engine under test will run at a torque of 2.60 and at 550 R. P. M. To obtain the next higher speed point in the test, the excitation is decreased slightly to lower the dynamometer characteristic slightly below that of curve D. For so small a change of adjustment, the new characteristic of the dynamometer will be almost parallel to curve D. It is evident then that beyond approximately 650 R. P. M. the engine torque will increase over that of the dynamometer and the engine will race to a speed above 4000 R. P. M.

Dynamometer characteristics similar to the foregoing are obviously useless except over a narrow range of operation. A partial solution to the problem is to design the eddy current brake so that its maximum torque occurs at a much higher speed.

Let it be assumed, for example, that in a brake whose speed-torque characteristics are those of curves A to E inclusive, a specifically different eddy current member can be substituted whose electrical resistances are, for example, two and one-half times those of the foregoing arrangement but whose magnetic reluctances are substantially unchanged. While such a condition may not be quite attainable in practice, the foregoing assumption will not result in serious error and it will serve to explain the principles with which we are concerned. Such an eddy current brake or dynamometer will have curves of speed against torque as shown in Fig. 3 in which the curves corresponding to A to E inclusive are replotted to a speed scale two and one-half times as great. These curves are shown dotted and are indicated by primes such as A' to E' inclusive.

In connection with the new characteristic curves A' to E' inclusive of the eddy current brake, consider again the engine having the full throttle characteristic F. The brake characteristics A', B' and C' and any intermediate characteristics at constant values of excitation each intersect the engine curve F at a substantial angle. At increasing speeds beyond the various intersections the brake torque increases at a greater rate than the engine torque. Hence the speed will not fluctuate or drift so that the operation will be stable and such an arrangement for the particular engine characteristic considered will yield successful test results.

Consider now the engine whose full throttle characteristic is that of curve G. The brake characteristic D' intersects the engine characteristic G at an acute angle but for increasing speeds beyond this point, the brake torque remains substantially constant while the engine torque undergoes a very appreciable decrease. Similarly, if an interpolation is made of various braking characteristics each at a constant field, and each intersecting the engine characteristic G, it will be found that for speeds increasing beyond the speed of intersection there is a slender but appreciable margin of braking torque over engine torque. It is, therefore, possible to test the engine having a characteristic G by means of the dynamometer whose characteristics are those represented by the dotted curves A' to E' inclusive.

It may still be contended that the dynamometer characteristics as shown by the dotted curves are neither very satisfactory nor convenient for testing an engine having the characteristic G. Momentary slight variations in fueling or ignition are to be expected and if the excitation for the eddy current brake is taken from an ordinary supply circuit, the voltage fluctuations caused by other loads going on and off may cause the supposedly constant excitation of the eddy current brake to undergo a slight variation. Since the engine characteristic G and the brake characteristics D' and the like intersect at an acute angle, the speed and the scale balance may be disturbed in the case of such variations somewhat more than is desirable.

If consideration is taken of the full throttle run of a still smaller engine having the same shape of characteristic but one-half the torque of G, it will be found that this engine characteristic and the braking characteristic E' coincide over the speed range from 1500 to 2500 R. P. M. It is obvious that a successful test could not be made in this range.

Comparing the curves A to E inclusive and the curves A' to E' inclusive, it has been shown that the dynamometer whose eddy current member has the higher resistance is sufficiently stable to be operative over a range within which the dynamometer whose eddy current member having the lower resistance is in operative. In the attainment of this result, however, dynamometer capacity at low speeds has been sacrificed. By the employment of a dynamometer whose characteristics are those of A, B, etc. although the characteristics at intermediate speeds are unstable and useless, the engine whose characteristic follows the curve F can be loaded at speeds from 425 R. P. M. to 1000 R. P. M. or somewhat higher. On the other hand, it has been shown, in connection with the eddy current member whose characteristic curves correspond to A', B', etc., that the use of a high resistance eddy current member introduces the limitation that such a brake cannot fully load the engine having the characteristic F at speeds below 1600 R. P. M. To obtain at low speeds the stability of the apparatus having the characteristics A', B', etc., in combination with the capacity of the apparatus whose characteristics correspond to A, B, etc., a fundamentally much larger brake must be used if the result is to be obtained merely by the use of a high resistance eddy current member.

It has been shown from the foregoing analysis that a rising torque characteristic with speed is vital for satisfactory operation. The apparatus of my invention, as in the Whiting application already referred to, provides the desired degree of stability including freedom from drifting of the speed which is substantially better than that obtainable with the apparatus having the characteristics A', B', etc., while at the same time retaining the low speed capacity of the apparatus having the characteristics A, B, etc. and enabling the accomplishment of this result without the employment of an excessively large and expensive dynamometer or brake element.

In explaining briefly the operation of the testing arrangement illustrated in Fig. 1, it will be assumed that the dynamometer 15 is being employed to load the engine 11 and that suitable means such as a cradle and scale are provided for measuring the dynamometer torque. The ratio between the separate excitation and the excitation supplied by the booster exciter is maintained automatically and is determined primarily by the size of the booster exciter. This ratio between separate excitation and booster excitation remains more or less fixed for any given load and speeds and the relative amount of boost may be controlled by the potentiometer 24 in the booster exciter field. The potentiometer 19 serves as a means for providing a major adjustment for the excitation of the dynamometer field winding 18. The employment of means such as potentiometer 24 in the field of the booster exciter to control the relative amount of boost is a distinct advantage. For example, in some cases, particularly where the booster exciter is relatively large, there may be certain tests where it is desired to have a fairly flat torque curve in order that the speed may be varied over a considerable range without an appreciable adjustment of torque. This might be desirable in those cases where curves are being run at approximately constant torque. In such cases the amount of boost need only be adjusted a sufficient amount to give stability while at the same time enabling an adjustment of the speed over a relatively wide range without appreciable change in torque, thereby following the engine characteristic curve approximately without appreciable adjustment of the field control elements or the potentiometer 19 and the vernier rheostat 22. The foregoing considerations and description of the method of operation also apply to the arrangement of Fig. 2 where, with the switch 21 thrown to the right, the fixed and variable components of excitation are supplied to the dynamometer 15 in different field circuits.

With regard to the capacity of the booster exciter to be employed in the illustrated embodiments, I have found as a result of several applications that satisfactory operation may be obtained by the employment of a booster exciter capable of supplying from 20 to 25 per cent of the total maximum dynamometer excitation at normal base speed of the dynamometer, or the speed at which the dynamometer delivers maximum horsepower. This booster exciter, however, furnishes a larger portion of the excitation at higher speeds, the percentage depending upon the speed range of the dynamometer. It is quite possible in certain applications that larger booster exciters than the foregoing may be required which are capable of supplying 50 per cent or more of the total excitation at base speed where this is necessary for stabilization.

In the foregoing arrangements, the exciter 15 furnishes a limited boost effect or increase in voltage depending upon the size of the unit and only enough to provide sufficient increase in slope of the torque curve of the dynamometer for stability to prevent fluctuations or drifting of the speed. Such an arrangement, whereby the exciter field is connected to the same potentiometer adjuster 21 as that which controls the separate or fixed component of excitation, automatically protects the exciter by preventing excessive voltages on the booster exciter at high dynamometer speeds. This is due to the fact that in order to keep within the maximum horsepower rating of the dynamometer it is necessary to reduce the field voltage and field current on the dynamometer as the speed increases. This reduction in voltage on the potentiometer 19 automatically reduces the voltage on the field of the booster exciter thereby reducing the voltage generated in the booster exciter. This feature not only makes it impossible to obtain dangerous voltages on the booster exciter and dynamometer field but also provides dynamometer adjustment to give a boost voltage which is somewhat in proportion to the actual field or total dynamometer excitation voltage. The apparatus is fool-proof and simple in that it requires no additional control over that normally used with the exception of a reversing switch such as 26 where the direction of rotation is to be reversed. Other than this, the normal potentiometer and vernier rheostat can be manipulated in the usual manner and the machine can be used for its entire speed range without fear of excessive voltages or damage of any part. The arrangement increases the slope of the dynamometer torque curve so that it will be greater than that of the engine torque curve at any point and thereby prevents the engine or prime mover under test from hunting or overspeeding. Consequently, the apparatus operates with stability.

There are several advantages to be obtained by the employment of a fixed component of voltage in conjunction with a component which varies with the speed over an arrangement where the exciter furnishes all of the excitation. Such a combination enables the booster exciter capacity to be reduced to an absolute minimum necessary for obtaining the proper stability. This permits in many cases the use of a booster exciter which is sufficiently small that it need not be cradled. That is the small capacity booster exciter need not be mounted on the cradled member of the dynamometer; but instead it may be mounted directly on the base or pedestal of the dynamometer, which is a distinct advantage from a cost standpoint. This arrangement of parts is made possible because the power necessary to drive the exciter is a small part of the total power such that the error in measurement or loading may be neglected without objection.

A further advantage of the combination of variable and fixed components of excitation is involved in the safety feature of the automatic control at high speed with the size of the exciter and consequently the voltage generated reduced to a minimum, the maximum voltage obtained at high speeds is not excessive. This combination also renders it possible to obtain maximum excitation on the dynamometer at low speeds. In order to obtain all of the available torque from the dynamometer at low speeds it is necessary that the full excitation voltage be available at these low speeds even though it may be only $\frac{1}{20}$ to $\frac{1}{10}$ of the normal base speed of the dynamometer. To supply full excitation from an exciter which is mechanically coupled to the dynamometer at these speeds would mean a tremendous size and consequently a possibility of extremely high voltages at high speeds. The importance of this feature becomes more readily appreciated when it is realized that these machines may be called upon to operate at speeds ranging from 100 to 6000 R. P. M. Since the torque curve of the dynamometer is inherently rising at these low speeds, as illustrated by the curves of Fig. 3, the stabilizing effect is not necessary in the low speed range. Consequently, the separate excitation source may be drawn upon to obtain maximum torque from the dynamometer at these low speeds without danger of instability, and at the same time an arrangement is provided whereby maximum excitation is obtained on the dynamometer over the entire speed range with a minimum size exciter.

The further importance and advantage of the combination of fixed and variable excitation, which makes possible a reduction in the size of the booster exciter without any sacrifice in the ability to provide maximum excitation at low speed, is seen from the operation standpoint. It is not necessary to make any change of connections to alter the relative amounts of excitation supplied from the separate or fixed sources and from the booster exciter, and in the present arrangement this desired condition of obtaining the excitation from the separate source at low speeds is obtained automatically. When more load is desired at low speed the operator follows the normal procedure of increasing the field current by the use of the potentiometer 19 in the dynamometer field. The field current is simply increased to the desired value by this potentiometer and, since the smaller portion of the excitation is available from the booster exciter at these low speeds, the potentiometer 19 is automatically adjusted to the point where the separate source of excitation is drawn upon for the required amount. On the other hand, as the speed increases and the voltage of the booster exciter increases the operator will, by means of the potentiometer 19, automatically reduce the dynamometer field current to the desired value thereby drawing less power from the separate source of excitation and using more of the power supplied by the booster exciter. This adjustment all takes place automatically as the operator manipulates the adjustable control contact 21 and the vernier rheostat 22.

In addition to the foregoing advantages there are still further advantages to be obtained in certain cases by the employment of the apparatus of Fig. 2, when the switch 27 is thrown to the left position. Such an arrangement makes it possible to obtain maximum efficiency of operation from the booster exciter. When two dynamometer fields are employed, the field 18b may be designed as a normal field to supply full excitation to the dynamometer from a separate source. An auxiliary field of smaller size such as 18a may then be connected to the booster exciter.

The underlying theory explaining the increased efficiency of the booster exciter by the use of a separate field may be better understood by assuming a fixed setting of the point 21 on the potentiometer 19 of Fig. 1. Now as the speed increases and the field current on the dynamometer increases due to the effect of the booster exciter, the current also increases in the portion of the potentiometer 19 from 31 to 32 thereby increasing the voltage drop. Since the voltage from 30 to 32 is constant, the result is a drop in voltage from 30 to 31 and consequently a drop in voltage across the booster exciter field for a given setting of the potentiometer 24 in the booster field. This drop in voltage across the booster exciter field actually has the effect of partially counteracting the booster effect to such an extent that in actual practice the amount of boost voltage obtainable may be no more than from 50 to 75 per cent of the total obtainable, depending upon the resistance of the potentiometer 19.

By utilizing the scheme shown in Fig. 2 the foregoing condition does not exist since constant excitation of the field winding 18b is maintained by the setting of the pointer 21 on potentiometer 19. As the speed increases the voltage delivered by the booster exciter increases and consequently the current delivered to the field winding 18a increases. In this case the increase in current delivered by the booster exciter is not carried by any part of the potentiometer resistance 19 and since the voltage relationships are not disturbed on potentiometer 19, the voltage on the field of the booster exciter remains constant with the result that the total boost effect and greater efficiency is obtained from the booster exciter. In other words, with this connection a maximum amount of boost may be obtained for a given size of booster exciter and for a given amount of power necessary to drive the booster exciter.

In certain phases of the testing operation and because of limitations in the available facilities, it may be found desirable temporarily to dispense with the variable component of dynamometer excitation and supply all of the excitation from the separate source of supply. Under such conditions of operation the switch 27 is thrown to the left. This has the effect of connecting the field windings 18a and 18b in parallel relation. The relative amounts of excitation supplied by these windings by inserting resistance elements in circuit with one or the other or both fields. The total excitation and thus the dynamometer torque is controlled by the potentiometer 19 and the vernier rheostat 22. For this condition of operation the switch 26 is maintained in the open position, or the adjustable contact 25 on potentiometer 24 is adjusted to provide zero excitation on field 23.

The advantage of this last mentioned arrangement may be found particularly in instances where the booster exciter is relatively large in comparison with the total excitation, and may be more fully appreciated by way of an example. Consider, for example, a single dynamometer field which is normally designed for 250 volt operation and assume that the apparatus is operated from a separate source of excitation at 125 volts to supply half of the excitation and that a booster exciter is provided to supply an additional 125 volts at base speed of the dynamometer. Under such conditions of operation with full field voltage it is possible to obtain full torque at base speed. However, if there is no source of separate excitation available of sufficient capacity to obtain full excitation or 250 volts, at extremely low speeds where the booster exciter is developing practically no voltage, it becomes a problem as to how to obtain full torque on the dynamometer at these low speeds. Under such conditions full torque on the dynamometer may be obtained by designing the dynamometer with two fields which are adapted to be operated in parallel from a separate source of excitation in case the operator finds it necessary to obtain full torque at low speeds on the dynamometer.

In accordance with the provisions of the patent statutes, I have described the principle of operation of my invention together with the apparatus which I now consider to represent the best embodiments thereof but I desire to have it understood that the apparatus shown is merely illustrative and that the invention may be carried out by other means.

What I claim as new and desire to secure by Letters Patent of the United States is:

1. In combination in a device for testing prime movers, an electric dynamometer for loading the prime mover to be tested, said dynamometer having a field winding for controlling the speed-torque characteristics thereof, means comprising a plurality of independent voltage sources connected in series cumulative relation for energizing said dynamometer field winding, the component of voltage obtained from one of said sources being variable in accordance with the speed of said prime mover and the component of voltage obtained from the other of said sources being of substantially constant magnitude, means for controlling the speed-voltage characteristic of said variable voltage source, means for energizing said last named controlling means, and common electric circuit means for adjusting simultaneously and in the same sense the degree of energization of said variable voltage controlling means and the degree of energization of said dynamometer field winding from said constant voltage source.

2. In a device for loading prime movers, an electric dynamometer having a rotary member adapted to be connected to the prime mover to be tested and having a field winding for controlling its speed-torque characteristics, an exciter generator having a field winding and an armature, said armature being driven at a speed proportional to said prime mover for generating a voltage responsive to the speed of said dynamometer, a substantially constant voltage source of electric power supply, adjustable means for deriving voltages of the desired magnitude from said source of supply, means connecting said dynamometer field winding in cumulative series circuit relation with said exciter armature and said means for deriving an adjustable voltage from said substantially constant voltage source of electric power supply, and means for energizing said exciter field winding from said substantially constant voltage source of electric power supply through said adjustable means for similarly and simultaneously varying the voltage generated by said exciter corresponding to a given speed and the magnitude of said adjustable voltage employed for energizing said dynamometer field.

3. In combination in a system for testing prime movers, an electric dynamometer comprising field producing means and a rotary element for placing a load of controllable speed-torque characteristics on the prime mover to be tested, means comprising a plurality of independent voltage sources for energizing said field producing means in a manner to produce magnetic fluxes in the same direction, the voltage of one of said sources being substantially constant and the voltage of the other of said sources being variable in accordance with the speed of said dynamometer to vary the braking torque of said dynamometer with variations in speed, common electric circuit means for simultaneously controlling the magnitude of the variable voltage component of excitation corresponding to a given speed and the magnitude of the constant voltage component of excitation, and means for changing the relative amount of said variable voltage component of excitation.

KENNETH R. McDOUGAL.